United States Patent [19]

Crown et al.

[11] Patent Number: 4,770,896

[45] Date of Patent: Sep. 13, 1988

[54] METHOD FOR MAKING CYLINDERS FOR OUTPUT SCANNERS

[75] Inventors: Colin Crown, Cambridge; Edward H. Last, Middlesex, both of United Kingdom

[73] Assignee: Crosfield Electronics, Herts, Great Britain

[21] Appl. No.: 70,448

[22] Filed: Jul. 7, 1987

Related U.S. Application Data

[63] Continuation-in-part of Ser. No. 793,038, Oct. 30, 1985, abandoned.

[30] Foreign Application Priority Data

Oct. 30, 1984 [GB] United Kingdom ................. 8427353

[51] Int. Cl.⁴ .......................... B05D 1/06; B05D 1/14; B05D 1/24; B05D 3/12

[52] U.S. Cl. ...................................... 427/29; 427/185; 427/195; 427/289; 427/292; 427/358

[58] Field of Search ................ 427/29, 185, 195, 289, 427/27, 292, 358

[56] References Cited

U.S. PATENT DOCUMENTS 4,528,909 7/1985 Rigg et al. ...................... 427/195 X

*Primary Examiner*—Evan K. Lawrence
*Attorney, Agent, or Firm*—Sughrue, Mion, Zinn, Macpeak & Seas

[57] ABSTRACT

An output scanner exposure cylinder perforated to allow exposure film to be held on to the cylinder by vacuum comprises a metal substrate carrying a coating of cured black resin composition which has been machined to e.g., a thickness of 0.1 to 1.5 mm. The resin is usually an epoxy resin and is applied as a powder and cured by heating.

15 Claims, No Drawings

METHOD FOR MAKING CYLINDERS FOR OUTPUT SCANNERS

This is a continuation-in-part of application Ser. No. 793,038, filed Oct. 30, 1985, now abandoned.

The present invention relates to output scanner cylinders.

In output scanning processes an electronic scanner scans the image that is to be reproduced to pick up the colours. Generally there are four separate colour signals, that is black, yellow, cyan and magenta. A signal for each colour may be used to expose by laser a photographic film. There are therefore produced four so called colour separations which are used to make four printing plates, one for each colour. The images from the printing plates are superimposed to produce a colour print.

The film that is exposed by the laser using information from the output scanner is generally supported by a vacuum on an exposure cylinder. Each exposure cylinder must have very accurate dimensions since differences in circumference of as little as 0.002 mm will result in defects in the final print that can be observed by the naked eye. The surface must be undamaged matt black in order that as little as possible of the imaging laser light is reflected back and in order that defects in the surface do not become visible in the final print.

Cylinders that are used in output scanners are made from aluminum tube which is turned to the required size and then perforated and black anodised to give the smooth black surface required. It is essential that anodisation is carried out after perforation since it is important for the metal surfaces on the inside of the perforations to be black anodised to make them non-reflective. Because the black coating is so thin, e.g. only a few atoms thick, the size of the perforations is not affected significantly by the anodisation step, thus it is possible to anodise after perforation. There are several problems with conventional cylinders of this type, the worst of which is they often have to be scrapped if they become damaged. For instance it is easy to make scratches in the anodised surface and these will show up as faults in the colour separations. The cylinder cannot be reworked because scratches cannot be removed except by re-anodising the whole surface and this etches away the aluminum and therefore decreases the circumference of the cylinder to an unsatisfactory degree.

It is essential for the cylinder to be made the right size before anodisation since there is obviously no possibility of altering the size after anodisation unless the whole process is reworked. Accurately turned and anodised aluminum cylinders are very expensive.

In secret trials we have tried to form the desired accurate matt black finish by spraying conventional matt black paint onto a metal cylinder but this was found to be unsatisfactory. The coating has to be machined to the required smooth accurate finish but this cannot be done when using conventional paint. The sprayed paint coating is generally too thin to turn, or if it is thick it is very uneven so that grinding would be necessary to achieve the desired smoothness and regularity and grinding results in clogging of the grinding wheel and consequential scratching of the coating.

In U.S. Pat. No. 4,528,909 (EP No. 94142) to Rigg gravure printing cylinders suitable for being engraved by laser are disclosed. They are coated with an epoxy resin containing carbon black. Technology developed for gravure cylinders is not in general of any relevance to output scanner cylinders and a person skilled in the art of manufacturing or using output scanner cylinders would not look to prior art relating to gravure cylinders. The two types of cylinders are completely different in form and are used in completely different environments for totally different purposes and, by necessity, they have entirely different properties and requirements.

A laser gravure cylinder as disclosed in Rigg is typically 8' long and 5' in circumference. It weighs between 1 cwt and one ton because it has to withstand very high compressive loads during printing. A gravure cylinder additionally must be laser engraveable and abrasion resistant and, for these reasons, coatings used in forming such gravure cylinders are based upon highly complex chemistry and often require specially developed methods of application to the cylinder. In essence, a gravure cylinder is used by printers in heavy engineering printing.

In contrast, cylinders for use in an output scanner do not need to exhibit the properties above given which are required for a laser gravure cylinder but require an entirely different set of properties. In more detail, cylinders for use in an output scanner must be matt black and non-reflective, must be capable of holding a film by vacuum but must permit easy sliding and release of the film. None of these properties are required in a gravure cylinder.

As a general rule, output scanner cylinders are far smaller than gravure cylinders, for example, a typical one would be about 10" in diameter and about 3' long. They must be light in weight so that they can spin at high speeds.

Such cylinders are used in an entirely different part of a printing plant, i.e., they are used upstream from printing plate production and are used by studio personnel who work hand-and-hand with graphics editors and layout designers, i.e., the environment of use is entirely different from laser gravure cylinders as disclosed in Rigg.

If the black anodisation step used to produce conventional output scanner cylinders were to be replaced by coating with a black resin as in Rigg, using the essential sequence of process steps for producing known output scanner cylinders, then firstly a cylinder would be turned to the appropriate size, which would then be perforated, and following perforation would be coated with the resin. While in anodisation the coating is so thin that it takes on the surface characteristics of the underlying cylinder surface, and thus does not require further machining, this effect can not be relied on in application of resin.

First, the process would not be successful since it is impossible to resin coat the cylinder to form a product having the very precise dimensions required of an output cylinder without a further machining step. Second, if the resin coated cylinder were turned after coating, then the burr produced on turning to the correct dimensions would block the perforations. Third, applying the resin after perforation would have the result that the perforations would become entirely blocked with resin during coating or made significantly smaller by resin entering the perforations during the coating operation. These features would have the disadvantage that the perforations would not longer properly fulfill their purpose, namely to enable film to be held against the cylinder by vacuum.

Thus, the person skilled in the art would discover that it would not be possible to perforate before resin coating. On the other hand, the person skilled in the art would also consider that perforating could not be done after coating, as this would leave shiny metal inner surfaces of the perforations which reflect light during the exposure of film when it is held upon the cylinder and thus adversely effect the output scanning process.

The present invention relates to a method of making a coated output scanner exposure cylinder perforated to allow exposure film to be releasably held onto the cylinder by vacuum, said coated cylinder having being machined to a smooth and substantially true cylinder, the coating on the cylinder being 0.1 to 1.5 mm thick, comprising the steps of coating the cylindrical substrate with a powdered black resin composition, heating the composition to form a continuous coating, machining the coating, and then forming perforations. The coating on the final cylinder is 0.1 to 1.5 mm thick, preferably 0.2 mm to 0.5 or 1 mm thick.

The process of the present invention using the steps in the sequence specified above relies upon the discovery that it is possible to perforate after the black resin coating has been applied without creating difficulties by revealing metal surfaces of the inside of the perforations which would be highly disadvantageous in the output scanning process. Surprisingly the thickness of the resin coating in the product cylinder specified is such that the bright metal of the core cylinder that is revealed following perforation is sufficiently far below the surface of the coating on the cylinder (i.e. at least 0.1 mm below that surface) so that it does not reflect light when it is used as an output scanner cylinder.

Substrate cylinders that may be used are preferably made from a metal, for instance aluminum or steel, but are generally made from steel since accurately turned steel cylinders are readily available.

The power resin is applied in a heat curable form, that is it is a thermosetting composition, but it may be a thermoplastic composition which melts to form a continuous coating. The coating should be machinable in order that the cylinder will meet the close dimensional tolerances required of cylinders of this type and in order that grooves may be cut in the surface to hold the exposure film on to the surface by vacuum. The coating should also be stable under storage conditions, which may range from 50 to 90% relative humidity and temperatures of −15° C. to 70° C., as well as working conditions of 18°-22° C. and 40-60% r.h. and under these conditions should be capable of remaining adhered to the metal cylinder despite the expansion and contraction of the metal with the temperature changes. The cured coating should also be resistant to cleaning fluids conventionally used on these cylinders.

Suitable resins include nylon and thermosetting polyesters, although the most preferred resin is an epoxy resin.

The powdered composition will comprise resin material, pigment or dye, curing agent and optionally filler and other additives.

The curing agent may be, for instance, an amidine and a suitable powdered epoxy containing this type of curing agent is 445 Black 23 epoxy supplied by Porter Paints Ltd., Sidcup, Kent, England.

Other suitable epoxy compositions are epoxy novolaks, as described in European patent specification No. 0,094,142.

The composition will also include black colouring agent, carbon black in amounts of 1 to 10% by weight of the composition generally being preferred.

The composition may also include lubricating additives to facilitate turning and to reduce wear on the turning tool. Suitable additives are molybdenum disulphide, graphite and polytetrafluoroethylene particles. The amount of lubricant additive typically is from 1 to 10% by weight of the composition.

Other suitable additives include flow agents, air release aid, filler and other conventional additives, but it is often preferred that the composition is substantially free of filler, as described in British patent specification No. 2,071,574.

The cured coating should preferably be substantially free of pinholes since these tend to reduce the physical strength characteristics of the coated cylinder, hinder the machining process and show up on the exposed film as blemishes. The coating is generally applied at a thickness to provide a cured coating of at least 0.5mm thick, but generally the coating need not be thicker than about 5 mm. Preferably the cured coating is between 1 and 2 mm thick.

The curable compositions are applied as powders, for example by applying sequential powder coatings. Coating may be by, for instance, electrostatic coating, floc spraying, fluidised bed coating or a combination of these methods.

Before being coated the substrate may be treated to improve the adhesion of the resin to the cylinder surface, for example a steel substrate may be precoated by known techniques with zinc or with a phosphate coating, e.g., a zinc and/or iron phosphate coating. Immediately before coating with the resin composition the substrate is preferably degreased and deoxidised by known processes.

The substrate is generally preheated to a temperature at which the powder will fuse upon contact either with the substrate or with resin already deposited on the substrate. The composition must be fused and curable compositions must be cured by heating on the substrate. The temperature and duration of the heating will be chosen having regard to the particular resin and curing agents, if any, used, and their relative amounts. The commercially available thermosetting systems generally require curing at a temperature of 180° to 250° C., preferably 210° to 240° C. for periods of half to six hours, preferably two to four hours. However these temperatures and/or times may be reduced by increasing the amount of accelerator in the composition.

In one method using a thermosetting resin the substrate is heated to a temperature at which the powdered composition fuses sufficiently to form an adherent layer but at which the composition does not cure. After the desired thickness of curable resin composition has been built up on the substrate the entire assembly is then heated to a higher temperature at which curing of thermosetting resins will occur. In a preferred method however the substrate is preheated to the curing temperature of the thermosetting resin and the resin is powder coated onto the heated substrate and flows to form a uniform layer of resin that cures substantially without further hearing. For a thermoplastic resin the cylinder is preferably heated to a temperature at which the resin fuses and is then coated with the thermoplastic resin composition. Thus little or, preferably, no external heating is applied and the fusing and curing results entirely from the preheating of the substrate. This is very advantageous as it eliminates the need for heating the print member after the powder coating step. The powdered resin composition will have to be formulated, in known manner, to ensure that it does not sag or flow unacceptably at the fusing and curing temperature.

The coating must then be machined to give the coated cylinder the required external dimensions. The degree of accuracy required of this machining will depend upon the standard of reproduction that is required from the exposed film but generally the machining will be such as to make the cylinder have a surface that is as truly cylindrical as possible and will be such that a plurality, generally two or four, of the cylinders have circumferences that do not vary from one another by more than 0.002 mm at the most.

The final machining, and preferably all the machining, is done by turning, that is to say by removing unwanted composition by a cutting action, generally by holding a cutting device against the cylinder whilst the cylinder turns. The cutting device for this turning is preferably a diamond. The diamond or other cutter preferably is arranged with a substantially zero rake, that is to say the direction of cutting is substantially parallel to the surface and the diamond preferably has a radius of about 0.4.

The coating of black resin that is left on the cylinder is generally from 0.1 to 1.5, preferably 0.2 to 0.5 or 1, mm in thickness.

The coating and the substrate cylinder must be perforated with the required small perforations such as holes or slots. These are best formed after coating and heating the resin composition and after at least one turning step. Preferably the perforations are very small, for instance not more than 2 or at the most 3 or 4 mm in diameter.

If the substrate cylinder were perforated before coating, with these small perforations, the resin composition would tend to bridge the perforations. For this reason the coating is drilled after turning to form the desired perforations through the coating and the substrate cylinder.

Any burr formed in the coating by the perforations can generally be removed by simple abrasion, for instance rubbing with a paper tissue. Similarly if it is desired to form slots in the coating these also are preferably formed after heating and generally are no more than 3 or 4 mm wide at the most. Although the main turning step of the process to form a cylinder is conducted before perforation, there may be a finishing step after perforation.

Before the film is applied to the cylinder it is often desirable to wipe the surface with an antielectrostatic composition to prevent the creation of sparks in the dark-room where the film is exposed.

We have surprisingly found that the resin coating, despite being relatively thick and generally including an inorganic pigment, does provide a surface on which exposure film can be accurately and releasably held by vacuum and can, despite the perforations, be machined by turning to the required very accurate dimensions. As a result of the invention it is thus possible, using readily available composition and standard powder coating and turning techniques, to provide an exposure cylinder that can very satisfactorily replace the existing black anodised cylinders but at a fraction of their cost.

A further important advantage of the invention is that if the surface becomes damaged or in any other way unsatisfactory it is no longer necessary to destroy the expensive finished cylinder but instead the desired surface can be regenerated. Thus the damaged coating can be removed and the cylindrical substrate recoated with a new coating of resin and again turned to the desired dimensions.

The following is an example of the invention.

A powdered epoxy resin composition containing carbon black and amididine curing agent and having a particle size below 75 microns (Porter Pain Ltd. 445 Black 23 Epoxy) was used as the epoxy powder.

A black anodised aluminum cylinder that had previously been used as an exposure cylinder and had been rejected was turned to about 0.5 mm under size and was then heated to about 220° C. and sprayed with the powdered composition using an electrostatic powder spray gun. The cylinder was held at that temperature for sufficient time, typically about 30 minutes, to complete fusion and curing. It is then cooled to room temperature. The thickness of the coating was 0.762 mm.

The cylinder was then diamond turned on a lathe at 890 rpm using a standard diamond tool having 0.4 radius and zero rake. Turning was controlled in conventional manner to give a very accurately dimensioned cylindrical surface.

2 mm wide slots 0.254 mm deep were milled in the coating around the circumference of the cylinder and a series of 8 mm, 2 mm and 1 mm holes were machined through the epoxy coating in register with corresponding perforations in the cylindrical substrate. Also 4 mm wide slots were milled in the coating connecting the 1 mm holes. Burr on the coating was removed by rubbing with a paper tissue.

A film suitable for output scanning was held onto the cylinder using a vacuum of 70 cm Hg. The pull off test reading was about 3 kg where the burr had been removed and about 2 kg where it had not. Both these values are satisfactory.

We claim:

1. A method of making a coated output scanner exposure cylinder perforated to allow exposure film to be releasably held onto the cylinder by vacuum, said coated cylinder having been machined to a smooth and substantially true cylinder, the coating on the cylinder being 0.1 to 1.5 mm thick, comprising the steps of coating the cylindrical substrate with a powdered black resin composition, heating the composition to form a continuous coating, machining the continuous coating, and then forming perforations.

2. A method according to claim 1 in which the substrate is a metal cylinder.

3. A method according to claim 1 or claim 2 in which the substrate is a steel cylinder.

4. A method according to claim 1 in which the resin composition comprises a curable epoxy resin.

5. A method according to claim 1 in which the coating composition comprises a thermosetting curable resin material, carbon black, and a curing agent.

6. A method according to claim 5 in which the curing agent is an amidine curing agent.

7. A method according to claim 1 in which the powdered resin composition is applied by electrostatic coating.

8. A method according to claim 1 in which the powdered resin composition is applied by floc spraying.

9. A method according to claim 1 in which the powdered resin composition is applied by fluidised bed coating.

10. A method according to claim 1 in which the resin is a thermosetting resin and the substrate is pre-heated to the curing temperature of the resin before being coated with the coating composition.

11. A method according to claim 1 in which the coating before being machined is 0.5 to 5 mm thick.

12. A method according to claim 1 in which the coating before being machined is 1 to 2mm thick.

13. A method according to any one of claim 1 in which the coated substrate is machined by turning.

14. A method according to claim 1 in which the coated substrate is machined by turning using a diamond cutter.

15. A method of making a coated output scanner exposure cylinder perforated to allow exposure film to be releasably held onto the cylinder by vacuum, said coated cylinder having been machined to a smooth and substantially true cylinder, the coating on the cylinder being 0.2 to 1 mm thick, comprising the steps of coating the cylindrical substrate with a powdered black resin composition sufficient to form a coating approximately 1 to 2 mm thick upon heating, heating the composition to form a continuous coating, machining the continuous coating, and then forming perforations.

* * * * *